UNITED STATES PATENT OFFICE.

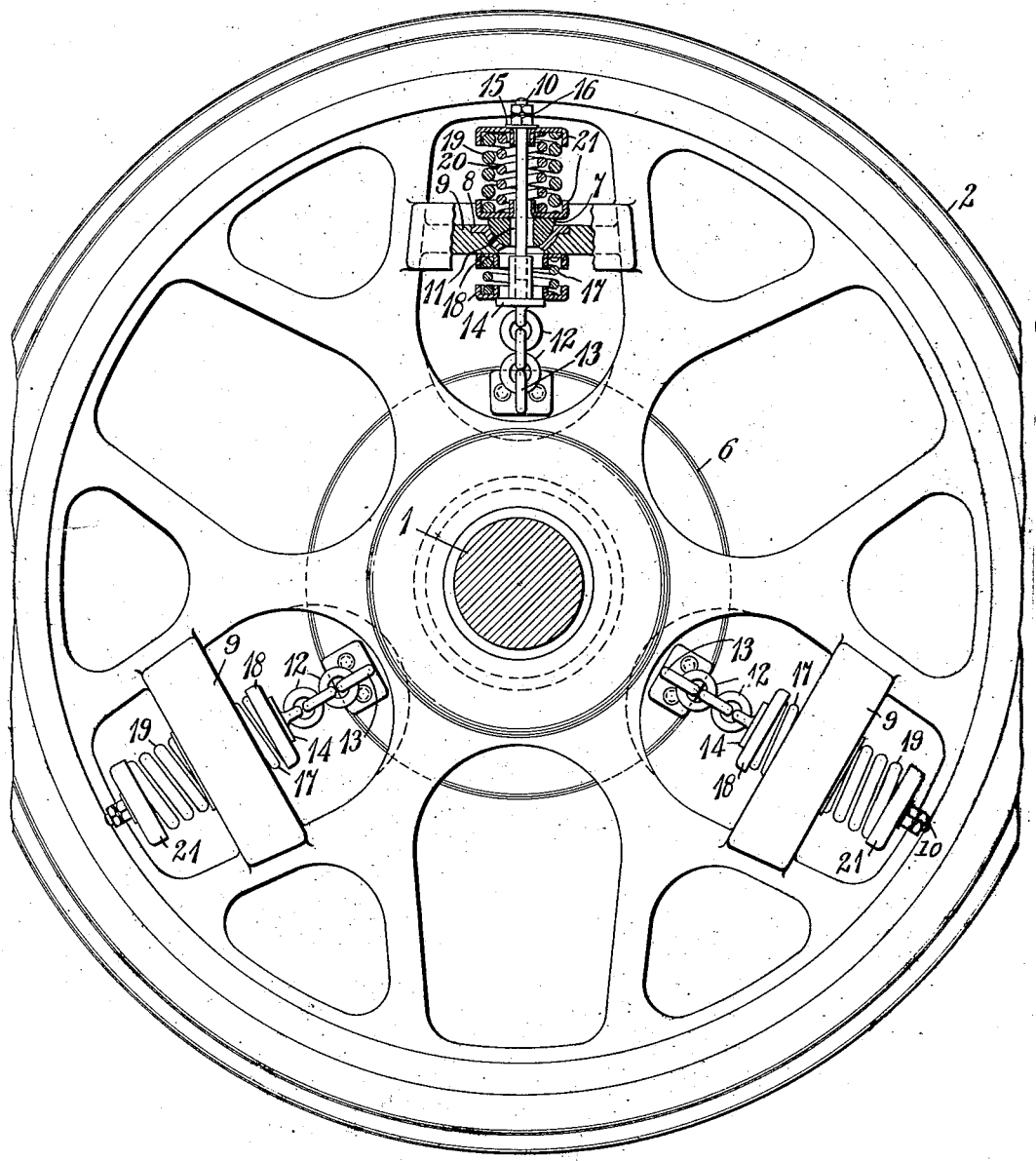

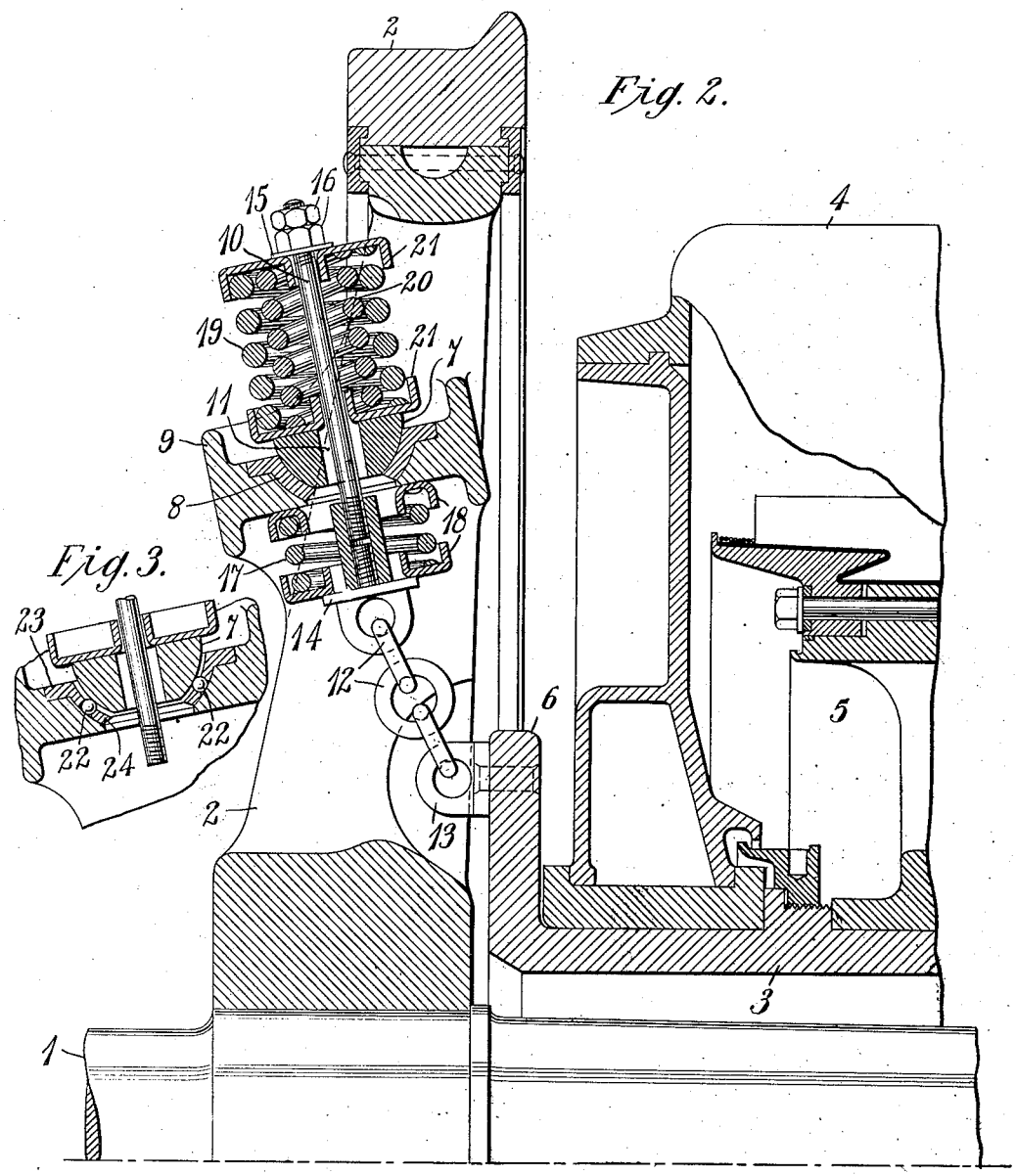

KARL F. ELERS, OF PITTSBURGH, PENNSYLVANIA, ASSIGNOR TO WESTINGHOUSE ELECTRIC AND MANUFACTURING COMPANY, A CORPORATION OF PENNSYLVANIA.

LOCOMOTIVE DRIVING CONNECTION.

1,056,894.   Specification of Letters Patent.   Patented Mar. 25, 1913.

Application filed May 9, 1911. Serial No. 626,129.

*To all whom it may concern:*

Be it known that I, KARL F. ELERS, a citizen of the United States, and a resident of Pittsburgh, in the county of Allegheny and State of Pennsylvania, have invented a new and useful Improvement in Locomotive Driving Connections, of which the following is a specification.

My invention relates to railway vehicles and it has special reference to electric motor-driven locomotives capable of developing large power at high speeds.

The object of my invention is to provide simple and relatively inexpensive driving connections between electric motors of large size and substantially concentric shafts or axles.

In order to permit the use of a yielding connection between the armature of a large electric motor and a concentric shaft or axle, it has been proposed to mount the rotating parts of the motor on a quill or sleeve, which loosely surrounds the driven axle or shaft, and to introduce a series of yielding radial connections between the ends of the sleeve or quill and wheels or gears located at the respective ends of the axle or shaft. According to my present invention, I provide a connection between these parts, which differs materially from those heretofore proposed and permits a maximum degree of freedom between the motor and the axle and, at the same time, relieves the steel springs, which comprise parts of the connection, from all strains except such strains in compression as they are especially adapted to withstand. By this means, the possibility of breaking the springs is minimized and the freedom of the connection permits the driving wheel axle or the countershaft, as the case may be, to move easily, relative to the motor, in all directions.

Figure 1 of the accompanying drawings, is an end view, partially in cross section, of a wheel axle and sleeve connected in accordance with my invention. Fig. 2 is a sectional elevation, on a larger scale, showing more in detail the connection between a sleeve or quill and a driving wheel and including a portion of an electric motor mounted on the sleeve. Fig. 3 is a detail view illustrating a slightly modified bearing structure which may be substituted for the bearing shown in Fig. 2.

Referring to Figs. 1 and 2 of the drawings, a driving wheel axle 1 of a railway locomotive or other vehicle, having driving wheels 2, is provided with a sleeve or quill 3 on which an electric motor, having a stator 4 and an armature or rotating part 5, is mounted. The sleeve 3 is provided with flanges 6 at its respective ends, only one of which is shown, and yielding radial connections are established between the sleeve and the wheel 2 at three points, as shown in Fig. 1.

The radial connections are substantially alike and each of them comprises a substantially hemispherical block 7 which is seated in a suitable bearing 8 provided in a ledge or block 9 which forms a part of the wheel 2, a rod 10 which extends through a hole 11 in the block 7 and is connected at one end, by means of links 12, to a projection 13 of the quill flange 6. The rod or bolt 10 is enlarged at each end, a flange 14 being provided at the inner end and a washer 15 and nuts 16 being provided at the opposite end. A spring 17 and seats or guards 18 are interposed between the flange 14 and the block 9 and springs 19 and 20 and seats or guards 21 are interposed between the hemispherical block 7 and the washer 15.

The arrangement of parts is such that the springs 19 and 20 act in opposition to the springs 17 and jointly tend to hold the rod 10 in a predetermined position. It is evident that the rod may be swiveled in all directions by reason of the universal joint established between the parts 7 and 8 but that any longitudinal movement of the rod will be opposed by the springs 19 and 20. The springs 19 and 20 are the driving springs since it is possible to transmit only a pull through the short chain, which is formed by the links 12. The springs 17 are back pressure springs and cushion the recoil of the springs 20 and 21 when they are released by some sudden movement of the wheel-axle relative to the motor and quill.

By reason of the fact that the radial connections are symmetrically arranged about the axle, a limited movement of the sleeve and motor is permitted in all directions, while, at the same time, a driving connection is established between the parts.

Since the quill and motor are located between the driving wheels and should be maintained in a substantially central position relative thereto, it is of special significance that the rods 10 are inclined relative to the planes of the driving wheels and tend to produce this result.

The number of radial connections may be varied within the scope of my invention, and the structure of each connection may be varied in size and arrangement of parts, for example: Ball bearings may be utilized between the hemispherical block 7 and the member 9 of the wheel, as shown in Fig. 3 of the drawings. Under these conditions, the steel balls 22 will be held in position and permitted to rotate freely in all directions by means of guide members 23 and 24 which together constitute a ball race and are substituted for the bearing member 8 of Fig. 2.

I claim as my invention:

1. The combination with a shaft having driven members at its ends and a sleeve or quill loosely surrounding the shaft, of a driving member secured to the sleeve or quill, and a series of radial connections, each comprising a ball and socket joint, a rod resiliently connected to one member of the joint and yieldingly connected to the sleeve or quill and a back pressure spring for holding the rod in position.

2. In a railway vehicle, the combination with a driving axle having driving wheels at its respective ends and a sleeve or quill loosely surrounding the axle, of a plurality of radial connections between the ends of the sleeve and the wheels, each connection comprising a ball and socket joint, a yielding connection, comprising a working pressure spring and a cushion spring between one member of the joint and the sleeve and a fixed connection between the other member of the joint and the wheel.

3. In a railway vehicle, the combination with a driving axle having driving wheels at its respective ends and a sleeve or quill loosely surrounding the axle, of a plurality of radial connections between the ends of the sleeve and the wheels, each connection comprising a ball and socket joint, a rod normally inclined to the plane of the wheel and yieldingly connected to one member of the joint and a link connection between the rod and the sleeve, the other member of said joint being fixed to the wheel.

In testimony whereof, I have hereunto subscribed my name this 27th day of April 1911.

KARL F. ELERS.

Witnesses:
 JAMES F. CURTIS,
 B. B. HINES.